United States Patent [19]

Linton et al.

[11] Patent Number: 5,014,843

[45] Date of Patent: May 14, 1991

[54] CAM OPERATED FIXTURE FOR A CONVEYOR

[75] Inventors: Leon Linton; Michael L. Campbell, both of Memphis, Tenn.

[73] Assignee: Southern Systems, Inc., Memphis, Tenn.

[21] Appl. No.: 250,265

[22] Filed: Sep. 28, 1988

[51] Int. Cl.[5] ............ B65G 47/24

[52] U.S. Cl. ............ 198/377; 198/474.1

[58] Field of Search ............ 198/377, 365, 838, 476.1, 198/474.1, 346.3; 118/314, 305, 322

[56] References Cited

U.S. PATENT DOCUMENTS

| | | | |
|---|---|---|---|
| 2,657,666 | 11/1953 | Fowler | 118/322 |
| 2,942,719 | 6/1960 | Bofinger et al. | 198/377 |
| 3,510,014 | 5/1970 | Speaker et al. | 198/365 X |
| 3,596,749 | 8/1971 | Altenpohl, Jr. et al. | 198/377 |
| 3,842,973 | 10/1974 | Rothert | 198/377 |
| 4,081,071 | 3/1978 | Nielsen | 198/365 |
| 4,089,404 | 5/1978 | Venzke | 198/365 |
| 4,174,773 | 11/1979 | Venzke | 198/365 |
| 4,180,152 | 12/1979 | Sefcik | 198/377 |
| 4,358,010 | 11/1982 | Besch | 198/838 |
| 4,378,062 | 3/1983 | Macrum | 198/365 |
| 4,399,904 | 8/1983 | Canziani | 198/365 |
| 4,726,464 | 2/1988 | Canziani | 198/365 |

FOREIGN PATENT DOCUMENTS

| | | | |
|---|---|---|---|
| 225113 | 5/1962 | Austria | 198/377 |

*Primary Examiner*—D. Glenn Dayoan
*Attorney, Agent, or Firm*—Walker & McKenzie

[57] ABSTRACT

A fixture for a conveyor that is cam operated. The fixture is mounted on a carrier and has at least one movably mounted product support arm for supporting the product as the fixture is moved past a work station for work, such as paint spraying, to be performed on the product. A carriage which has a track mounted thereon is movable by an air cylinder to move the track into the path of engagement with a cam operably coupled to the product support arm for the positioning of the cam support arm.

10 Claims, 2 Drawing Sheets

CAM OPERATED FIXTURE FOR A CONVEYOR

BACKGROUND OF THE INVENTION

1. Field of the Invention

The present invention relates in general to cam operated fixtures for conveyors.

2. Description of the Related Art

Heretofore, in fixtures for conveyors which are utilized, for example, to spray paint parts such as parts of automobiles as they are moved along by a conveyor, as the part came to a paint spray station the paint spray equipment such as the paint spray guns were moved into various positions relative to the part being sprayed by robotic painting, bells, etc. In such a normal system today, the amount of paint that is transferred to the part being sprayed is 30% to 40% with the remainder being wasted, as for example, by going up the exhaust stack and polluting the atmosphere.

SUMMARY OF THE INVENTION

The present invention is directed toward providing an improved cam operated fixture for a conveyor which when utilized with a conveyor, for example to paint parts of automobiles and the like, increases the paint transfer efficiency considerably, as for example, in some cases it will nearly double the paint transfer efficiency and thus reduce the amount of paint pollutant emission by nearly one half.

The concept of the present invention is to present the part at the proper attitude by moving the part itself by means of cam operated arms on which the parts are mounted.

One of the objects of the present invention is to reduce considerably the pollutant emissions from such operations as paint spraying on a conveyor.

A further object is to obtain the best paint finish possible in connection with all types of spray guns whereby the part itself is moved to give whatever attitude of the part provides the maximum paint transfer efficiency and to provide a class A finish for all desired surfaces.

A further object is to provide means for stabilizing the conveyor carrier cart or trolley upon which the cam operated fixture is mounted.

A further object is to provide a cam operated fixture wherein the sprayed parts may be kept with the sprayed surface being horizontal (or desired attitude) for a given period of time while in the oven in order to obtain the proper flow of paint consistency for a class A surface and then after exiting the oven, the parts may be raised to a vertical (or portion thereof) position so as to have a smaller silhouette which takes up less floor space and tigher turns can be negotiated.

The cam operated fixture of the present invention comprises, in general, support post means, at least one product support, means movably mounting said product support from the support post means, and actuating means operatively coupled to the product support for movement of the product support to various poisitions.

DESCRIPTION OF THE PREFERRED EMBODIMENT

Figure 1:
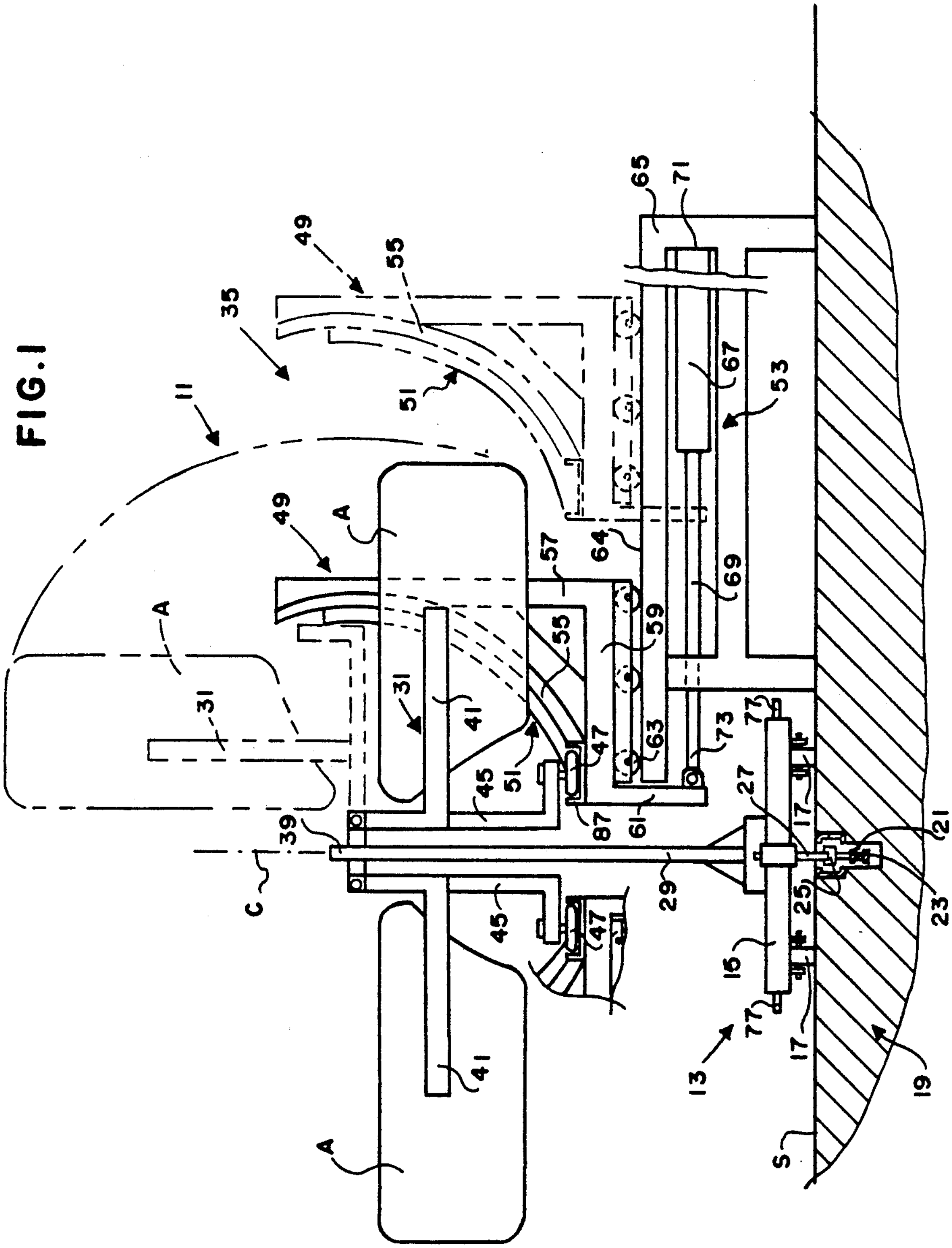
FIG. 1 is a front elevational view of the cam operated fixture of the present invention shown in combination with a conveyor, and with parts broken away and omitted for purposes of illustration.

The cam operated fixture 11 of the present invention is adapted to be used in combination with a conveyor for conveying parts such as parts A past work stations, as for example, paint spray stations, to spray paint parts of automobiles. In the drawings one particular type of conveyor 13 is illustrated, but it will be understood that other types of conveyors may be utilized with cam operated fixture 11 without departing from the spirit and scope of the present invention.

Conveyor 13 is well known to those skilled in the art and preferably includes one or more carts or carriers 15 having caster wheels or trolley support wheels 17. Only one of carriers 15 is shown in the drawings. Also conveyor 13 includes power means 19 for moving carrier 15 along the supporting surface S. Power means 19 includes the usual power track 21 and a power driven chain 23 having pushers 25 attached thereto for engaging a tow pin 27 on carrier 15 in the usual manner to move carrier 15 along the supporting surface S and past work stations, not shown, such as paint spraying stations as is well known to those skilled in the art. It will be understood that the term "carrier 15" can be taken to mean a pusher and free trolley witout departing from the spirit and scope of the present invention.

Cam operated fixture 11 includes, in general, support post means 29, product supports 31, mounting means 33, and actuating means 35.

Support post means 29 preferably includes a pair of post 37 each having a lower end 38 and an upper end 39. Posts 37 are preferably fixedly mounted adjacent the lower ends 38 thereof to carrier 15 respectively adjacent the front and rearward portions of the carrier 15 by suitable means well known to those skilled in the art, and upstand from carrier 15 along the centerline C thereof in spaced relationship to each other or if desired posts 37 may be offset from centerline C without departing from the spirit and scope of the present invention. Also, if desired, suitable means, not shown, but well known to those skilled in the art may be provided for adjusting the vertical height of the posts 37 relative to carrier 15.

A product support 31 is preferably provided on each side of carrier 15 and the following description of one of these product supports 31 and its related parts will suffice for both since they are substantially the same in construction except that one is of left hand construction and the other is of right hand construction. Thus, the cam operated fixture 11 is symmetrical about the centerline C thereof.

Product support 31 is of any suitable shape and construction that will support the particular part on which work is to be done. For example, with the product A illustrated in the drawings, which is the front part of an automobile to be painted, the product support 31 is a pair of L-shaped members 41 to which the part A is attached by means, not shown, now known to those skilled in the art.

Mounting means 33 movably mounts product support 31 from support post means 29 for pivoting movement about a horizontal axis extending along the direction of travel of the carrier 15. Mounting means 33 preferably includes a rotation shaft 43 which is rotatably mounted from posts 37 adjacent the upper ends 39 thereof by suitable means well known to those skilled in the art. The upper ends of L-shaped members 41 are respectively fixedly attached to rotation shaft 43 by suitable well known means such as welding or the like.

Actuating means 35 is operably coupled to product support 31 by means of rotation shaft 43 for movement of product support 31 to various positions to move the product A, as for example, to a horizontal position shown in solid lines in FIG. 1, a vertical position shown in broken lines in FIG. 1, and to various positions between said horizontal and vertical positions.

Actuating means 35 includes in general a cam wheel support arm 45 operably coupled to product support 31, a cam wheel 47 rotatably mounted on cam wheel support arm 45, a carriage 49, a track 51 mounted on carriage 49, and air cylinder means 53 for moving carriage 49 betweem engaged positions in which track 51 is in the path of engagement with cam wheel 74 and disengaged positions in which track 51 is not in the path of engagement with cam wheel 47. Track 51 preferably includes a channel shaped member 55 which is spiral shaped as seen in FIG. 1.

Cam wheel support arm 45 is preferably L-shaped as best seen in FIG. 1 and the upper end thereof is fixedly attached to rotation shaft 43 as by welding or the like so that movement of support arm 45 is effective to correspondingly move product support 31. Cam wheel 47 is rotatably mounted from the lower end of support arm 45 by suitable means well known in those skilled in the art and is adapted to engage channel shaped member 55 to guide the support arm 45 and therefore product support 31 into various positions. Channel shaped member 55 is fixedly mounted on carriage 49 by suitable means as welding or the like.

Carriage 49 preferably includes an upstanding portion 57 fixedly attached to a horizontal portion 59, and an depending portion 61 depending from the end of horizontal portion 59. In addition, carriage 49 includes wheels 63 movably supporting the carriage on the upper surface 64 of a base 65, which in turn is supported from supporting surface S adjacent conveyor 13.

Air cylinder means 53 is of a construction well known to those skilled in the art and includes a cylinder 67, a piston rod 69 connected to a piston and suitable valves etc., not shown for extending and retracting air cylinder means 53. The base end 71 of cylinder 67 is fixedly attached to base 65 and the distal end 73 of rod 69 is fixedly attached to depending portion 61 in any manner well known to those skilled in the art. It will be understood that air cylinder means 53 provides selective camming of arms 45 and product support 31, but if desired channel shaped member 55 may be mounted in a fixed position to cam arms 45 and product support 31.

Figure 3:
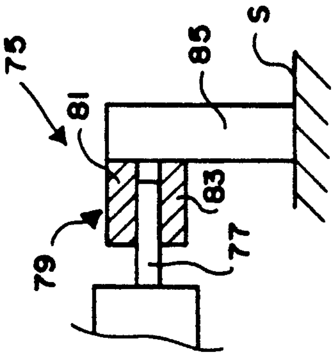
FIG. 3 is a partly sectionalized enlarged view of the stabilizing means of the present invention.
Figure 2:
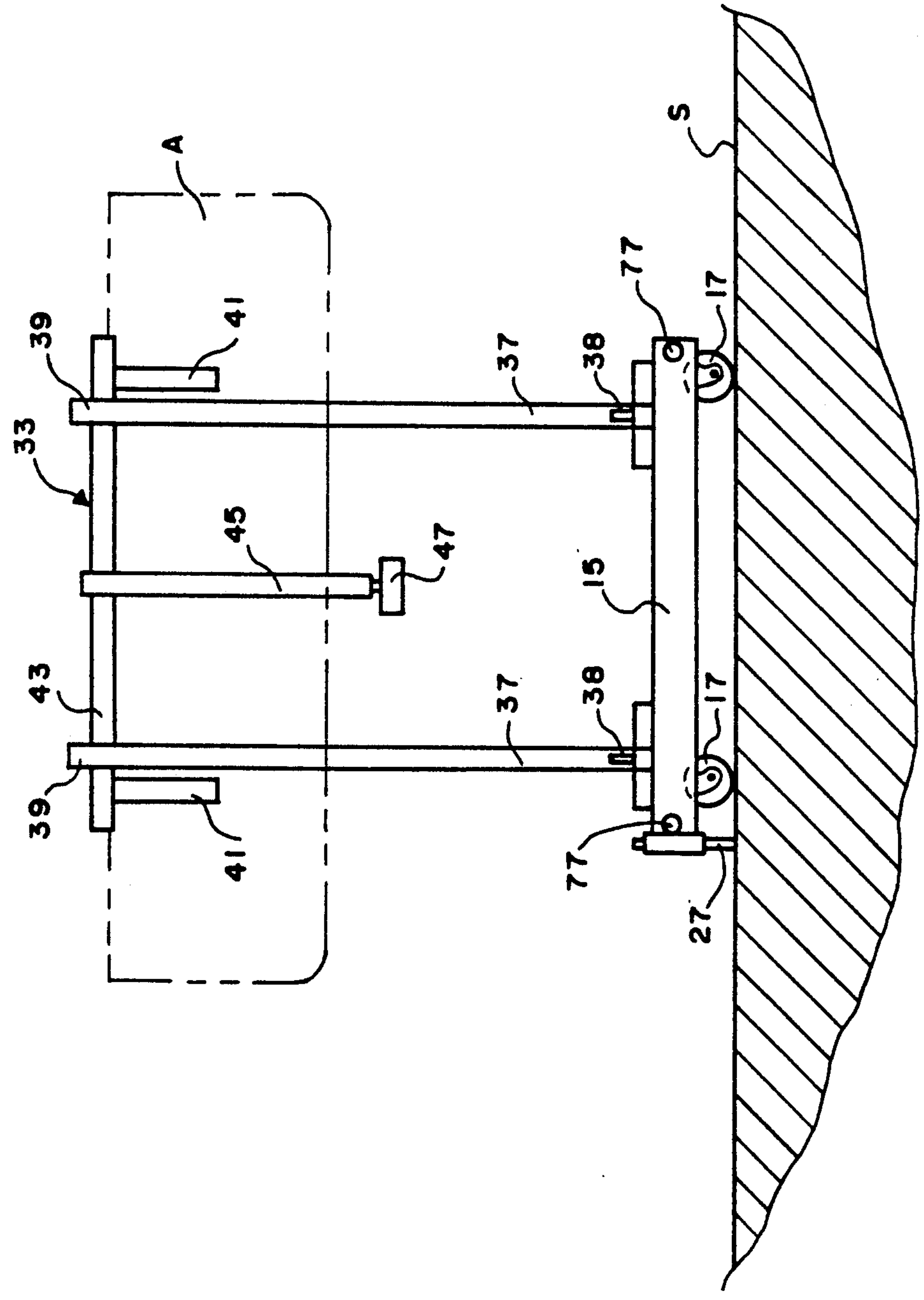
FIG. 2 is a side elevational view of a portion of the apparatus shown in FIG. 1.

Stablizing means 75 is operably coupled to carrier 15 for stabilizing the carrier. Stabilizing means 75 preferably includes four pins 77 fixedly attached to opposite sides of carrier 15 at the front and rear of the carrier and extending laterally therefrom. Stabilizing track means 79, which is a part of stabilizing means 75, is provided on opposite sides of power track 21. The stabilizing track means 79 on each side of power track 21 are substantially indentical and the following description of one will suffice for both. One of the stabilizing track means 79 is shown in FIG. 3 and includes an upper horizontally extending track portion 81 and a lower horizontally extending track portion 83 spaced below upper track portion 81 for movably and closely receiving pins 77. Upper and lower track portions 81, 83 are fixedly supported from surface S by means of support member 85. It will be understood that stabilizing means 75 stabilizes carriers 15 against any tilting movement of the carriers, particularly at the work stations, where stabilizer track means 79 are preferably provided.

In the operation of the apparatus of the present invention it will be understood that each carrier 15 will be moved along supporting surface S by power means 19 in a well known manner past work stations, not shown, where various operations are performed on the parts A, such as paint sprayng. Actuating means 35 moves product support 31 to the desired position at the desired time to place the part A at the proper attitude so that the paint transfer efficiency is increased considerably and thereby the amount of paint pollutant emission is correspondingly reduced.

In the operation of actuating means 35, product support 31 and product A are normally in a given position, as for example, in the example shown product support 31 and product A are in a normal horizontal position, but it will be understood that by proper use of balancing weights or the like, not shown, the normal position of the product support 31 and product A could be otherwise, as for example vertical. In the following description of the operation of the apparatus of the present invention it will be assumed that product support 31 and product A are in a normal horizontal position, and when it is desired to move the product support 31 and product A to other positions actuating means 35 is actuated. Thus, when air cylinder means 53 is extended, carriage 49 is moved into an engaged position shown in solid lines in FIG. 1 in which track 51 is in the path of engagement with cam wheel 47 so that when carrier 15 arrives at a position wherein cam wheel 47 becomes engaged with the entrance or lower end 87 of track 51, continued movement of carrier 15 will cause cam wheel 47 to be guided upwardly by track 51. This will cause product support 31 and product A to move upwardly to various positions such as the vertical position shown in broken lines in FIG. 1. It will be understood that with various shapes of track 51 and various positions of track 51 along the length of travel of carrier 15, as well as the positioning of carriage 49, the desired positioning of the product support 31 and product A can be accomplished. For example, the sprayed parts may be kept with the sprayed surface being horizontal for a given period of time while in the oven in order to obtain the proper flow of paint consistency for a class A surface and then after exiting the oven the part A may be raised to a vertical position so as to have a smaller silhouette which takes up less floor space and tighter turns can be negotiated. This raising of the part can be accomplished by moving carriage 49 to a disengaged position such as the one shown in broken lines in FIG. 1.

Although the present invention has been described and illustrated with respect to a preferred embodiment thereof and a preferred use therefor, it is not to be so limited since changes and modifications can be made therein which are within the full entended scope of the invention.

We claim:

1. A cam operated fixture for a conveyor of the type including a movable carrier and power means for moving said carrier, said cam operated fixture comprising in combination:

(a) support post means fixedly mounted on said carrier;

(b) at least one product support means for attaching a product;

(c) means movably mounting said product support means on said support post means; and (d) actuating means for being operably coupled to said product support means for movement of said product support means to various positions, said actuating means including a carriage, separate from the carrier, and means for moving said carriage between an engaged position in which said actuating means is operably coupled to said product support means and a disengaged position in which said actuating means is operably decoupled from said product support means.

2. A cam operated fixture for a conveyor of the type including a movable carrier and power means for moving said carrier, said cam operated fixture comprising in combination:

(a) support post means fixedly mounted on said carrier;

(b) at least one product support;

(c) means movably mounting said product support on said support post means; and (d) actuating means for being operably coupled to said product support for movement of said product support to various positions, said actuating means including a carriage and air cylinder means for moving said carriage translatably between an engaged position in which said actuating means is operably coupled to said product support and a disengaged position in which said actuating means is operably decoupled from said product support.

3. A cam operated fixture for a conveyor of the type including a movable carrier and power means for moving said carrier, said cam operated fixture comprising in combination:

(a) support post means fixedly mounted on said carrier;

(b) at least one product support;

(c) means movably mounting said product support on said support post means; and (d) actuating means for being operably coupled to said product support for movement of said product support to various positions, said actuating means including a cam wheel support arm operably coupled to said product support, a cam wheel rotatably mounted on said cam wheel support arm, a carriage, a track mounted on said carriage, and means for moving said carriage between an engaged position in which said track is in the path of engagement with said cam wheel and a disengaged position in which said track is not in the path of engagement with said cam wheel.

4. The cam operated fixture of claim 3, in which said means for moving said carriage comprises an air cylinder means.

5. The cam operated fixture of claim 3, in which said track comprises a channel member disposed in the shape of a spiral.

6. A cam operated fixture for a conveyor of the type including a movable carrier and power means for moving said carrier, said cam operated fixture comprising in combination:

(a) support post means fixedly mounted on said carrier;

(b) at least one product support;

(c) means movably mounting said product support on said support post means; and (d) actuating means for being operably coupled to said product support for movement of said product support to various positions, said actuating means for including a cam wheel support arm operably coupled to said product support, a cam wheel rotatably mounted on said cam wheel support arm, a carriage, a track mounted on said carriage, said track including a channel shaped member disposed in the shape of a spiral, and air cylinder means for moving said carriage between an engaged position in which said track is in the path of engagement with said cam wheel and a disengaged position in which said track is not in the path of engagement with said cam wheel.

7. In combination, a conveyor including a wheeled movable carrier for movement along a supporting surface and power means for moving said carrier along said surface; a cam operated fixture including support post means fixedly mounted on said carrier, at least one product support means for attaching a product, means movably mounting said product support means on said support post means, and actuating means for being operably coupled to said product support means for movement of said product support means to various positions, said actuating means including a carriage, separate from the carrier, and means for moving said carriage between an engaged position in which said actuating means is operably coupled to said product support means and a disengaged position in which said actuating means is operably decoupled from said product support means; and stabilizing means operably coupled to said carrier for stabilizing said carrier.

8. The combination of claim 7 in which said stabilizing means includes at least one pin fixedly attached to said carrier and extending laterally therefrom, and a stabilizer track means fixedly attached to and supported from said supporting surface for movably and closely receiving said pin.

9. In combination, a conveyor including a wheeled movable carrier for movement along a supporting surface and power means for moving said carrier along said surface; a cam operated fixture including support post means fixedly mounted on said carrier, at least one product support, means movably mounting said product support on said support post means, and actuating means for being operably coupled to said product support for movement of said product support to various positions; and stabilizing means operably coupled to said carrier for stabilizing said carrier, said actuating means including a cam wheel support arm operably coupled to said product support, a cam wheel rotatably mounted on said cam wheel support arm, a carriage, a track mounted on said carriage, and means for moving said carriage between an engaged position in which said track is in the path of engagement with said cam wheel and a disengaged position in which said track is not in the path of engagement with said cam wheel.

10. A cam operated fixture for a conveyor of the type including a movable carrier and power means for moving said carrier, said cam operated fixture comprising in combination:

(a) support post means fixedly mounted on said carrier;

(b) at least two product supports;

(c) means movably mounting said product supports on said support post means; and (d) actuating means associated with each said product support for being respectively operably coupled to each said product support for movement of each said product support to various positions, each said actuating means including a carriage and means for moving said carriage between an engaged position in which each respective said actuating means is operably coupled to each said respective product support and a disengaged position in which each respective said actuating means is operably decoupled from each respective said product support.

* * * * *